3,523,811
PIGMENTARY FERRIC AMMONIUM FERRO-
CYANIDE PARTICLE WITH CATIONIC SUR-
FACTANT COATING
John Henry Cramer and Walter Eldon Ness, Marietta, Ohio, assignors to American Cyanamid Company, Stamford, Conn., a corporation of Maine
No Drawing. Filed July 3, 1967, Ser. No. 650,639
Int. Cl. C09c 1/26, 3/00; C09d 11/02
U.S. Cl. 106—304     4 Claims

ABSTRACT OF THE DISCLOSURE

Iron-Blue pigments of improved storage stability as a component of ink compositions result from treating a ferric ammonium ferrocyanide pigment, preferably while still in aqueous dispersion, with a cationic surfactant of the asphalt anti-stripping type, such as an alkylamidoalkyl-hydroxyalkyl quaternary ammonium compound, such as stearamidopropyl-dimethyl-2 - hydroxyethyl ammonium nitrate.

BACKGROUND OF THE INVENTION

Field of the invention

This invention relates to Iron-Blue pigment compositions which show an improved resistance to color change or loss of strength or change of hue or tone, hereafter called strength loss, which are obtained by treating an Iron-Blue pigment with a surface modifying agent which causes the individual pigment particles to remain independent and each contribute to the coloration of an ink. On standing, particularly in the presence of heat and moisture, inks containing conventional Iron-Blue pigments tend to change hue and decrease in intensity—i.e. lose strength. The loss of strength is at least compatible with the theory that individual pigment particles coalesce or flocculate thereby reducing the number of separate particles which contribute towards the color, although other phenomena may be involved.

Description of the prior art

Cook and Moss, U.S. Pat. 2,589,674, "Aliphatic Amido Propyl Quaternary Ammonium Salts," Mar. 18, 1952, disclose quaternary ammonium compounds of the "formula

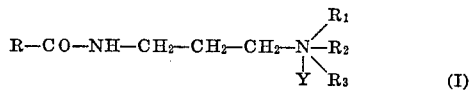

wherein R is a member of the group consisting of aliphatic and alicyclic radicals containing at least 7 carbon atoms such as nonyl, undecyl, tridecyl, heptadecyl, the residue of abietic acid, and the like radicals; $R_1$ and $R_2$ are members of the group consisting of alkyl and hydroxyalkyl radicals of 1–3 carbon atoms such as, for example, methyl, ethyl, propyl, isopropyl, hydroxyethyl, dihydroxypropyl, and the like radicals; $R_3$ is a hydroxyalkyl radical of 1–3 carbon atoms such as, for example, hydroxyethyl, hydroxypropyl, dihydroxypropyl and the like; and Y is an anion such as, for example, halogen, hydrogen sulfate, thiocyanate, etc."

Lacey and Waitkins, U.S. Pat. 2,823,205, "Oil and Spirit-Soluble Derivatives of Phthalocyanine," Feb. 11, 1958, in Example 6, disclose adding stearamidopropyl dimethyl beta-hydroxy ethyl ammonium chloride to the sodium salt of tetra-(o-carboxybenzamidomethyl) copper phthalocyanine to get a spirit-soluble colorant from printing inks.

Miss Newman, U.S. Pat. 3,133,893, "Pigment Particles Coated with Polymer and Method of Preparing Same," May 19, 1964, shows dispersal of pigments in water as a press cake with stearamidopropyldimethylhydroxyethyl ammonium chloride, adding a monomer such as acrylonitrile, polymerizing on the surface of the pigment particles, and obtaining polymer coated pigment particles, which are readily dispersible in a polymer solution for dope-dyed textile fibers, such as acrylic fibers, or in printing inks, etc.

Carpenter and Kolodny, U.S. Pat. 2,937,106, "Dialkyl-polyaminopolyalkalene Amides as Asphalt Antistripping Agents," May 17, 1960, disclose "compounds of the general formula:

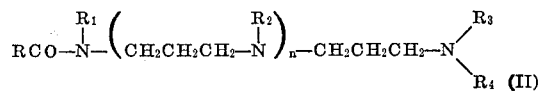

where the RCO is an acyl group derived from a carboxylic acid of from 12 to 20 carbon atoms which may be of the saturated or unsaturated fatty acid series, and particularly naturally occurring acids and their mixtures, $R_1$ and $R_2$ are hydrogen or 1 to 4 carbon alkyl radicals, $R_3$ and $R_4$ are alkyl radicals of from 1 to 4 carbon atoms, and $n$ is a small whole number, not less than 1 nor more than 4; and the fatty acid and rosin acid salts of these amides."

Other asphalt antistripping agents are also disclosed therein.

SUMMARY OF THE INVENTION

Iron-Blue is a ferric ammonium ferrocyanide of somewhat variable chemical composition produced by the reaction of ammonium sulfate and ferrous sulfate and sodium ferrocyanide, in an aqueous media. Either atmospheric oxygen or an oxidizing agent such as sodium or potassium dichromate or sodium chlorate gives at least a partial oxidation and changes the pale blue slurry to a pigment grade of Iron-Blue. The digest volume, "The Chemistry of the Ferrocyanides," American Cyanamid Company, Wayne, N.J., 1953, Beacon Press, New York, has 742 references to various phases of the chemistry of the ferrocyanides. One ferrocyanide useful as a pigment, Prussian Blue, was referred to by Diesbach in 1704.

The Iron-Blues are among the most economical of the blue colors on a price-strength basis. Printing inks including those used for printing newspapers are customarily made with carbon black, and often other colors, as pigments in the composition containing oils, solvents, frequently naturally occurring resinous materials such as asphalts and other agents to modify the hue, tone or intensity and drying properties and acceptability by various types of papers, ease of flowing through the various feed systems to the type as well as improving general rheological properties. Commercial carbon blacks normally produce a yellowish or brownish black printing ink. By proper toning with purple or blue a so-called Neutral Black is obtained. For this all of the radiant light energy is absorbed. Iron-Blue is commonly used as one of the pigments for toning carbon black inks.

Such an ink on standing will revert to the yellowish shade if the blue pigment loses its efficiency, and changes hue, tone or intensity.

Iron-Blue pigments may also be used as the only color, or as a toner for other colors.

Hue and strength changes are quite common in ink and paint systems. In the present Iron-Blues, heat and moisture tend to increase the rate of strength loss. The use of the agents of the present invention appears to cause the pigment particles to be more fluocculation resistant, and as a result the individual Iron-Blue pigment particles remain separate from other pigment particles and as a result the strength of the blue effect remains, and the ink instead of turning brown remains the desired shade of black.

Other treating agents which have been used for the improvement of properties such as texture improving agents, and emulsifying agents, such as mineral oil and sulfonated oils, may be present also.

Cationic surfactants, including those which have been used as asphalt antistripping agents, give a major increase in the resistance to heat and moisture so that the strength loss is markedly decreased. The quaternaries shown in Cook and Moss, 2,589,674 supra, are incorporated into the pigment composition by adding the quaternary to the pigment composition while still in the slurry as formed, or the agents may be sprayed or ball milled onto the pigment composition later in processing. A usage from about 1% to 15%, preferably in the order of 3% to 4% based on the weight of the Iron-Blue pigment appears to be an economically desirable range.

Preferred quaternary compounds are stearamidopropyldimethyl-2-hydroxyethyl ammonium nitrate and stearamidopropyldimethyl-2-hydroxyethyl ammonium dihydrogen phosphate. Other long-chained fatty acids may be used to form the amido group, such as palmitic acid or the tall oil group of acids. The preparation of such compounds is described in said 2,589,674.

The loss of strength can be tested by preparing inks containing the particular Iron-Blue under consideration with or without carbon black. These inks may then be drawn down on hard paper or news stock alone or over a test print area. The strength loss is compared by duplicating the tests before and after holding under test conditions of time, temperature and moisture exposure. The aging is accelerated at higher temperatures. Any standardized conditions can be used for comparative purposes, and may vary depending on the ultimate storage and use conditions contemplated.

In the following examples, all parts are by weight unless clearly otherwise stated.

EXAMPLE 1

To a slurry of 4500 parts of a commercial Iron-Blue pigment in water, as formed without previous drying, there is added 136 parts of stearamidopropyldimethyl-2-hydroxyethyl ammonium nitrate. The mixture is stirred for five minutes after which it is filtered, dried and ground in the conventional manner. When used in ink with carbon black, marked improvement in strength loss resistance is obtained. The amount of the quaternary is about 3% based on the dry weight of the Iron-Blue pigment composition.

EXAMPLE 2

To a conventional dry Iron-Blue pigment which had already been formed, dried, and prepared in pigmentary form, in a blender which was kept stirring continuously, there was added 3% of the weight of the pigment of stearamidopropyldimethyl-2-hydroxyethyl ammonium nitrate as a 50% solution in a water-isopropyl base. Stirring was continued until the blend was uniform.

The product when tested in ink formulations showed greater resistance to strength loss than the same pigment which had not been so treated.

Similar results are obtained when using the phosphate salt as well as when using tall oil amidopropyldimethyl-2-hydroxyethyl ammonium phosphate (i.e. the fatty acids from tall oil) or when using other long-chain fatty acid compounds of the type described in said U.S. Pat. 2,589,674.

When commercial Iron-Blues as purchased in the market have added thereto a long-chained alkylamidoalkylhydroxyalkyl quaternary ammonium compound, valuable increases in strength loss resistance are obtained.

We claim:
1. An Iron-Blue pigment of improved storage stability in fluid inks of the gravure type comprising finely divided ferric ammonium ferrocyanide particles of pigmentary size which particles individually have thereon a coating of from 1% to 15% by weight of pigment of a quaternary ammonium compound of the formula:

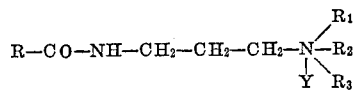

wherein R is a member of the group consisting of aliphatic and alicyclic radicals containing 7 to 20 carbon atoms, $R_1$ and $R_2$ are members of the group consisting of alkyl and hydroxyalkyl radicals of 1–3 carbon atoms, $R_3$ is a hydroxyalkyl radical of 1–3 carbon atoms, and Y is a nitrate or phosphate anion.

2. The Iron-Blue pigment of claim 1 in which the coating compound is 1% to 15% of stearamidopropyldimethyl-2-hydroxyethyl ammonium nitrate.

3. The Iron-Blue pigment of claim 1 in which the coating compound is 1% to 15% of tall oil amidopropyldimehyl-2-hydroxyethyl ammonium phosphate.

4. The method of forming the improved storage stable Iron-Blue pigment of claim 1 comprising: to a slurry of Iron-Blue pigment in water, which pigment has not been dried, adding from about 1% to 15% based on dry weights, of the alkylamidoalkyl-hydroxyalkyldialkyl quaternary ammonium compound of claim 1, stirring, and thereby coating the individual pigment particle with said compound, separating the water, and drying the coated pigment.

References Cited

UNITED STATES PATENTS

| | | | |
|---|---|---|---|
| 113,755 | 4/1871 | Farrer | 106—307 |
| 2,005,697 | 6/1935 | Grove. | |
| 2,282,006 | 5/1942 | Slvan | 106—304 XR |
| 2,589,674 | 3/1952 | Cook et al. | |
| 2,742,375 | 4/1956 | Cooke et al. | |
| 2,785,079 | 3/1957 | Voet | 106—307 XR |
| 2,823,205 | 2/1958 | Lacey et al. | |
| 2,893,886 | 7/1959 | Erskine et al. | |
| 3,353,974 | 11/1967 | Trimble et al. | 106—304 XR |

TOBIAS E. LEVOW, Primary Examiner

H. M. S. SNEED, Assistant Examiner

U.S. Cl. X.R.

106—20, 307, 308, 309